United States Patent [19]

Matsuo et al.

[11] Patent Number: 4,989,040
[45] Date of Patent: Jan. 29, 1991

[54] POSITION INPUT APPARATUS ENCLUDING A POSITION DETECTOR INPUT APPARATUS

[75] Inventors: Toshihisa Matsuo, Yamatokoriyama; Kazuyuki Ougita, Nara; Junichi Kajiwara, Yamatokoriyama; Masakiyo Okuda, Kashiwara, all of Japan

[73] Assignee: Sharp Corporation, Osaka, Japan

[21] Appl. No.: 286,961

[22] Filed: Dec. 20, 1988

[30] Foreign Application Priority Data

Dec. 21, 1987 [JP] Japan .................................. 62-324791
Dec. 21, 1987 [JP] Japan ............................. 62-194327[U]
Dec. 21, 1987 [JP] Japan ............................. 62-194328[U]

[51] Int. Cl.$^5$ ............................................. G03G 15/00
[52] U.S. Cl. ...................................... 355/218; 338/99; 178/18
[58] Field of Search ...................... 355/218, 202; 341/4, 341/5; 346/706; 338/99, 114; 178/18, 19; 340/711, 712

[56] References Cited

U.S. PATENT DOCUMENTS 3,974,332 8/1976 Abe et al. ................................ 178/18
4,570,149 2/1986 Thornburg et al. ................. 338/114
4,679,927 7/1987 Sogo et al. ........................... 355/218

Primary Examiner—Joan H. Pendegrass

[57] ABSTRACT

A position detector outputs an electrical signal of a level corresponding to a pressed position. The detector has at least three reference points, each reference region begin set therebetween. When the position detector is pressed, the region to which the pressed position belongs is discriminated, and the pressed position is operated relative to the two reference points defining the region, on the basis of the previously stored outputs from the reference points and the output from the pressed position. The position detector has a strip of upper and lower electrode both with wiring members and a grounded conductor provided under the lower electrode. The upper and lower electrodes and the wiring members for the electrodes are disposed so that they are positioned inwardly of the periphery of the conductor at least by the distance equal to that from the upper surface of the upper electrode to the upper surface of the conductor. The electromagnetic effects to the apparatus are absorbed in the grounded conductor, protecting the electrodes and wiring members from noise. On the upper surface of the upper electrode is attached are a plurality of touch protrusions.

14 Claims, 11 Drawing Sheets

POSITION INPUT APPARATUS ENCLUDING A POSITION DETECTOR INPUT APPARATUS

BACKGROUND OF THE INVENTION

1. Field of the Invention

The present invention relates to a position input apparatus to be used for example, on an operation panel of a copying machine and to a position detector used for the position input apparatus.

2. Description of the Prior Art

A position input apparatus on a plane surface may be needed, for example, to specify the position of a copy image when editing work such as trimming, masking and moving of a copy image done in a copying machine.

Conventionally, a position input apparatus is used includes position detecting means mode from a strip of conductor and a strip of resistor disposed opposite each other. There is conventionally a complementary operating means for performing complementary operation of a pressed position in accordance with an output from the position detecting means when it is pressed.

In the above position detecting means, when a portion of the resistor body is pressed while a given voltage is being applied across the resistor electrode, a voltage corresponding to the pressed position is developed across the resistor electrode.

On the other hand, the voltage values that the position detecting means outputs when the reference points provided at both ends of the position detecting means are pressed are those previously stored in the complementary operating means. A pressed position can be obtained by performing complementary operation of the pressed position on the basis of the voltage that the position detecting means outputs when it is pressed and the previously stored voltage outputs from the reference points.

Figure 1:
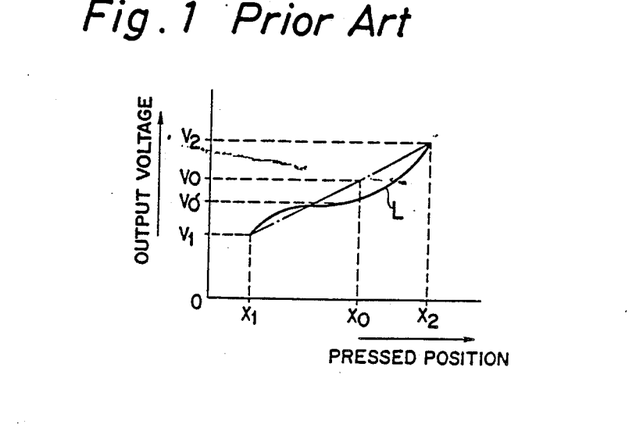
FIG. 1 shows the relationship of the pressed position relative to the output voltage in the prior art.

However, because of the effects of variations in the resistivity and cross section of the resistor, the relationship of the output voltage relative, to the pressed position does not always result in a linear valve in the position detecting means, as shown for example by the curve L in FIG. 1. For that reason, the voltages that the position detecting means outputs when the two reference points X1 and X2 provided in the position detecting means are pressed are V1 and V2 respectively, pressing the position X0, for example, causes the voltage V0' to be output instead of the voltage V0. If the difference between these voltage V0, and V0 is greater than the resolution of the complementary operating means, the pressed position is erroneously recognized.

Accordingly, the above, prior art position input apparatus has a problem which is that the accuracy of position input cannot be improved even if resolution of the complementary operating means is enhanced, and therefore it tends to erroneously recognize the position input. In many cases, such a tablet type position input apparatus have generally high output impedance. In particular, when the electrode is not pressed, they stay in entirely a high impedance state. This tends to cause noise in the signals output from the tablet type position input apparatus because of the effects such as electromagnetic wave and static electricity. Accordingly, such tablet type position input apparatus is a problem in that an apparatus provided with such tablet type position input apparatus tend to malfunction or fail to operate.

According to other prior art, a tablet type position input apparatus is used which, for example, which includes a planar resistor larger than a document to be copied and a stylus pen having a pointed tip with a built-in switch. In this table type position input apparatus, a position on a plane surface can be input by pressing the desired position on the planar resistor with the stylus pen. However, the tablet type position input apparatus of the above prior art has a problem which is that a stylus pen must be used each time when inputting a position, and therefore, the operatability is not very good. Operatability may be improved if the resistor plate is pressed directly with a finger. In this case, however, the area pressed with a finger is substantially larger than when the resistor is pressed with a stylus pen with a pointed tip, and a delicate positional difference results each time the resistor is pressed even if the same area is pressed, leading to a worsened reproducibility and a substantial drop in the accuracy of position input.

SUMMARY OF THE INVENTION

Accordingly, it is an object of the invention to provide a position input apparatus having an enhanced accuracy of position input by reducing the difference between the actually pressed position and the position operated by complementary operation.

It is another object of the invention to provide a position input apparatus which prevents generation of noise by electromagnetic effects.

It is still another object of the invention to provide a position input apparatus having a simplified construction and an enhanced accuracy of position input.

A position input apparatus in accordance with the invention which accomplishes the above objects provided with a position detecting means for applying output corresponding to a pressed position. There is a complementary operating means for operating to complement the pressed position on the basis of both an output applied from the position detecting means and an output applied from the position detecting means when reference position is pressed by pressing the position pressing means. There is a region discriminating means for discriminating a region to which the pressed position belongs when the position detecting means is pressed. Also included is a control means for controlling the complementary operating means to perform complementary operation based on the reference points in the region to which the pressed position belongs. There are at least more than three reference points and the regions between the neighboring reference points are set into the position detecting means.

In a preferred embodiment of the invention, the position detecting means includes a strip of conductor and a strip of resistor disposed opposite each other with a space provided therebetween.

In another preferred embodiment, of the invention, the complementary operating means performs the complementary operation using the following equation:

$$\frac{AD - AD_{V_i}}{AD_{V_{(i+1)}} - AD_{V_i}} (X_{(i+1)} - X_i)$$

wherein Xi is coordinate of the reference points Pi (i=1, 2, ..., N), Vi is analog output corresponding to the coordinate Xi, $AD_{V_i}$ is digital data corresponding to the analog output Vi, and AD is digital data corresponding to the pressed position X, when the digital data AD belongs to the region Ai between the reference points Pi and P(i+1).

In a further preferred embodiment of the invention, the position detecting means has an upper electrode strip and a lower electrode strip being disposed opposite each other. The electrodes output an electrical signal corresponding to a pressed position. There is a grounded conductor provided under the lower electrode, the upper and lower electrodes and wiring members connected to the electrodes so structured that they are positioned inwardly of the periphery of the conductor at least by the distance equal to that from the upper surface of the upper electrode to the upper surface of the conductor.

In a still further preferred embodiment of the invention, the position detecting means includes upper and lower sheets disposed opposite each other. There is an upper electrode installed on the back surface of the upper sheet, and a lower electrode installed on the upper surface of the lower sheet. The position detecting means outputs an electrical signal of level corresponding to a position pressed on the upper sheet and has a plurality of protrusions provided on the upper surface of the upper sheet in accordance with the resolution of the position input.

The above construction permits complementary operation to be performed according to the region to which a pressed position belongs. Accordingly, by setting the region size for complementary operation to an appropriate size, error by complementary operation can be easily reduced if the relationship of the output relative to the pressed position is not linear in a position detecting means.

In particular, error by complementary operation can easily be made smaller than the resolution of the complementary operating means, which means that the accuracy of position input can be raised by enhancing the resolution of the complementary operating means, ensuring the prevention of erroneous recognition of position input.

According to the above construction, the conductor provided under the lower electrode is constantly kept at the potential of 0 V because it is grounded. Furthermore, the upper and lower electrodes and wiring members are all positioned inwardly of the periphery of the conductor at least by the distance equal to that from the upper surface of the upper electrode to the upper surface of the conductor.

Therefore, if electromagnetic wave or static electricity is developed in the vicinity of the upper and/or lower electrode, the electromagnetic wave or the static electricity is absorbed in the grounded conductor. Accordingly, noise contained in the signal output from the position detector is considerably reduced, thus preventing an apparatus provided with the position detector from malfunctioning or failing.

According to the above construction also, when the upper sheet is pressed with a finger, the finger touches the top of a protrusion provided on the upper surface of the upper sheet. This makes the pressure converge on a limited area on the upper electrode which comes directly under the bottom of the protrusion provided on the upper sheet, thus contacting the upper electrode with the lower electrode only on this limited area.

As described above, since the accuracy of position input is not affected if a special pen such as a stylus pen is not used, a position detector with good operability and superior accuracy can be constructed with ease and at low cost.

DESCRIPTION OF THE PREFERRED EMBODIMENTS

Figure 2:
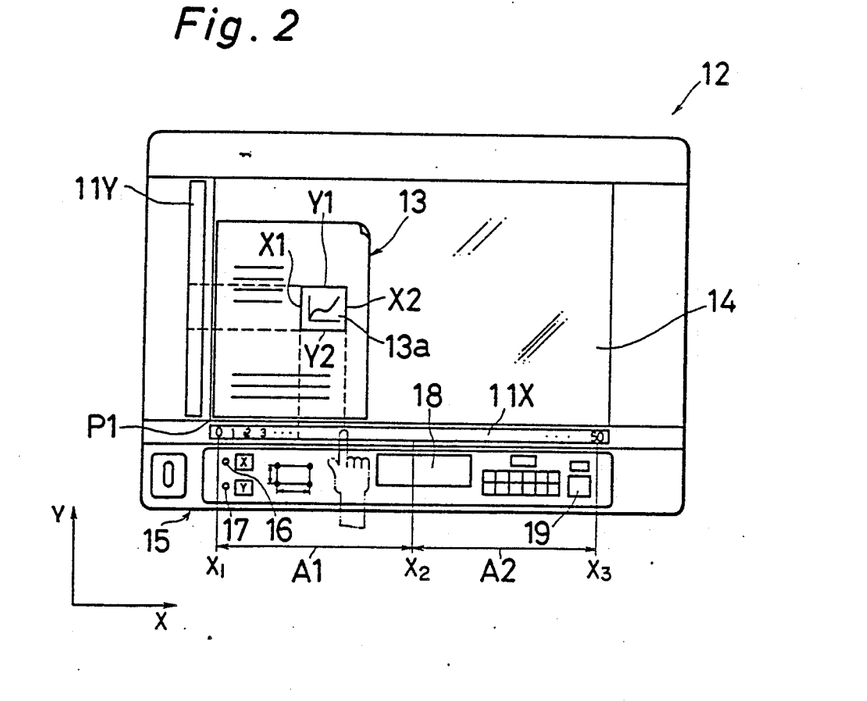
FIG. 2 plan view of a construction of a copying machine employing position detecting means 11X and 11Y.
Figure 8:
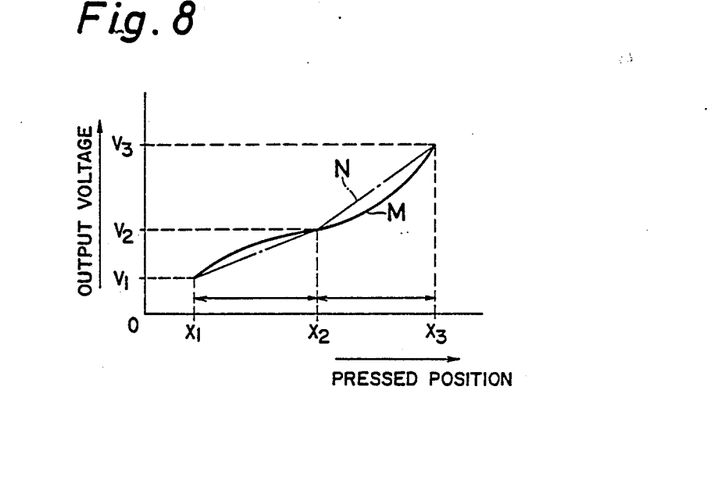
FIG. 8 shows the potential at each position on a lower electrode 24 in the position detecting means 11.

Referring now to FIG. 2 and FIG. 8, the following description deals with one embodiment of the invention in which a tablet type or planar position detecting means is provided on a copying machine as position detecting means and the position detector is used to specify the position of a copy image when editing work such as by trimming, masking or moving of a copy image.

Figure 3:
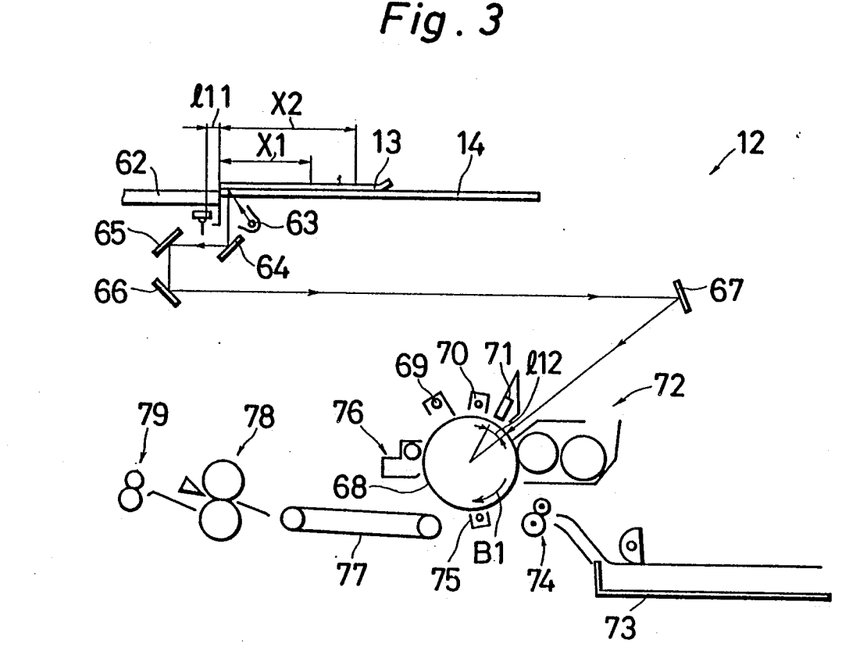
FIG. 3 shows a construction of a copying machine 12.

The tablet type position detecting means 11X and 11Y (collectively denoted by the numeral 11) are provided, for example, in a copying machine 12 as shown in FIG. 3, and are used to specify the position of a copy image when editing work such as by trimming, masking or moving of a copy image on a copy document 13. The tablet type position detecting means 11X and 11Y are disposed respectively along the X and Y directions along the periphery of a platen glass 14, and are embedded in an operation panel 15.

On the operation panel 15 are also provided an X-coordinate input button and a Y-coordinate input button used to specify the position of a copy image in the X and Y directions respectively, as well as a display 18 to display the operating conditions of the copying machine 12, a start button to start the copying operation, etc.

FIG. 3 is a cross sectional view showing the construction of the copying machine 12. The platen glass 14 is installed on a body 62 of the copying machine 12, on which the copy document 13 is placed. Under the platen glass 14 are disposed a light source 63 which illuminates the document 13 and reflecting mirrors 64, 65, 66 and 67 which transmit the light reflected from the document 13. The light reflected by the reflecting mirror 67 strikes a photosensitive drum 68 which is being driven to rotate about its axis in the direction of an arrow B1.

Around the photosensitive drum 68 and along the direction of the arrow B1 are disposed a discharging lamp 69 which removes residual charge from the previous exposure cycle, a charging unit 70 which applies a uniform charge over the entire surface of the photosensitive drum 68 to prepare for the next exposure cycle, selective discharging means 71 having a construction as hereinafter described, a developing unit 72 which converts an electrostatic latent image formed on the photosensitive drum 68 by exposure to the light reflected by the reflecting mirror 67 into a visible image by the developing agent such as toner, a transfer unit 75 which transfers the visible toner image onto copy paper being transported from a paper cassette 73 by a paper feed roller 74, and a toner collecting unit 76 which collects residual toner on the photosensitive drum 68.

The paper onto which the toner image is transferred by the transfer unit 75 is transported by a paper feed roller 77 to a fuser roller 77 by which the image is fixed onto the paper, before being discharged from the copying machine 12 by a paper feed roller 79. The image of the document 13 placed on the platen glass 14 reaches the photosensitive drum 68 upside down, being reflected by the reflecting mirror 64 and projected through an optical means such as a lens.

Figure 4:
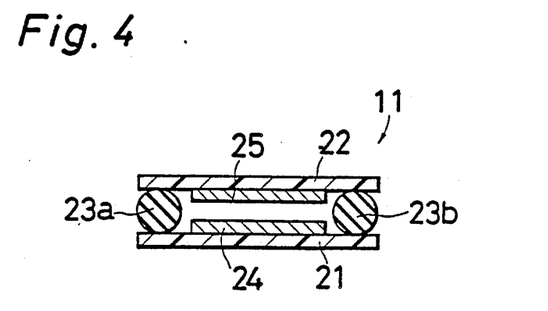
FIG. 4 is a vertical sectional view of the position detecting means 11.

As shown in FIG. 4, the tablet type position detecting means 11 includes of a lower sheet 21 and an upper sheet 22, both formed from a polyester film, with spacers 22(a) and 23(b) of synthetic resin or other elastic material disposed therebetween. On the upper surface of the lower sheet 21 is installed a lower electrode 24 formed from a strip of resistor. Also, on the back surface of the upper sheet 22 is installed an upper electrode 25 made of silver paste which is a strip conductor.

Figure 5:
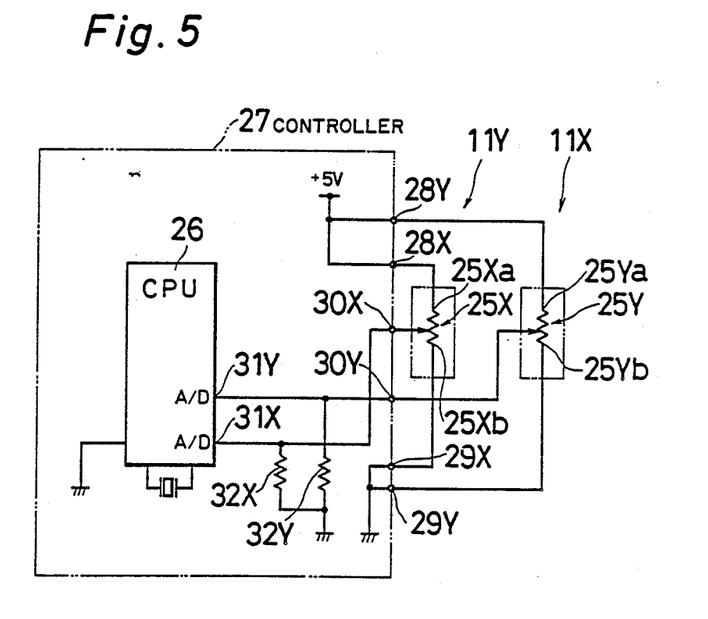
FIG. 5 shows the electrical circuit in which the position detecting means 11X and 11Y are connected to a controller 27 in the copying machine 12.
Figure 6:
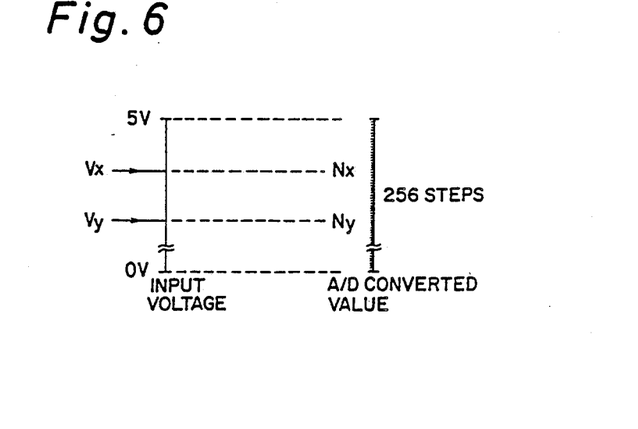
FIG. 6 shows the relationship of the input voltage level to the CPU 26 in the copying machine 12 relative to the analog-digital converted value of the input voltage level.

As shown in FIG. 5, the copying machine 12 is provided with a controller 27 having a CPU (Central Processing Unit). To this controller 27, the tablet type position detecting means 11X and 11Y are connected. To be more specific, voltage terminals 28X and 28Y connected to the upper electrodes 25X and 25Y in the tablet type position detecting means 11X and 11Y are both connected to +5 V supply, while voltage terminals 29X and 29Y are grounded. Output terminals 30X and 30Y connected to the lower electrodes 24X and 24Y are connected to A/D convert pins 31X and 31Y on the CPU 26.

The A/D convert pins 31X and 31Y are further connected to the ground via resistors 32X and 32Y having a greater resistance than that between the ends 25Xa and 25Xb on the upper electrode 25X and between the ends 25Ya and 25Yb on the upper electrode 25Y respectively.

According to the above construction, voltage of +5 V is applied to the upper electrode 25 in the tablet type position detecting means 11 on the voltage terminal 28, while the voltage terminal 29 is grounded. Since the upper electrode 25 is formed from a resistor having a uniform cross section along its entire length, the potential at a given point on the upper electrode 25 is proportional to the distance from the end 25b.

When the upper sheet 22 is pressed from above, the upper electrode 25 contacts the lower electrode 24 at the position pressed, and a voltage Vx proportional to the distance lx from the end 25b to the pressed position is developed at the lower electrode 24, the lead and the output terminal 30. For example, if the distance is 432 mm between the ends 25a and 25b on the upper electrode 25 in the tablet type position detecting means 11, the following voltage is developed.

$$Vx = \frac{lx}{432} \cdot 5 \,(V) \qquad (1)$$

The voltage Vx developed at the output terminal 30 in the tablet type position detecting means is input to the A/D convert pin 31 on the CPU 26. The voltage is then analog-digital converted in the CPU 26 to the value Nx in 256 steps from 0 to 255. That is, the value Nx is expressed as $$Nx = Vx \cdot \frac{255}{5} \qquad (2)$$

Therefore, the CPU 26 reversely calculates the above equations 1 and 2 from the value Nx obtained by analog-digital conversion, thereby obtaining the distance fx for the position X pressed on the upper sheet in the tablet type position detecting means as follows:

$$lx = Nx \cdot \frac{432}{256} \,(mm) \qquad (3)$$

Similarly, in the tablet type position detecting means 11Y, supposing the upper electrode 14Y is 297 mm from end to end, if a voltage Vy developed when the position at a distance fy from the end is pressed is input to the A/D convert pin 31Y on the CPU 26 and analog-digital converted to a value Ny, the distance fy can be obtained as $$ly = Ny \cdot \frac{297}{256} \,(mm) \qquad (4)$$

Figure 7:
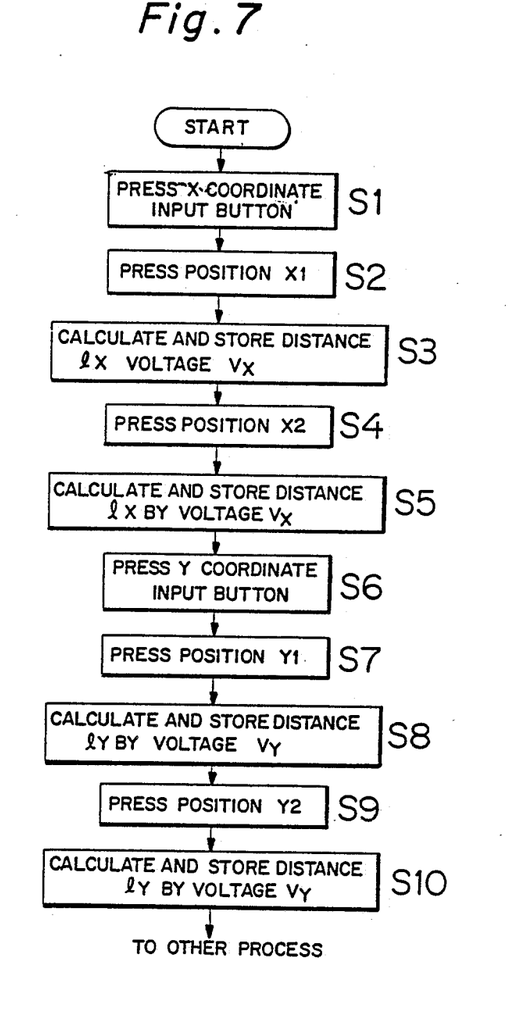
FIG. 7 shows the operating procedure for specifying a copy region and the operating sequence of the controller 27.

Therefore, if the limited area on the document 13 surrounded by the lines X1, X2, Y1 and Y2 is to be copied, for example, the copy area can be specified by following the procedure and by the operation of the controller 27 as shown in FIG. 7.

To be more specific, first press the X coordinate input button 16 (Step S1), then press the position on the tablet type position detecting means 11X that intersects an extension of the line X1 (Step S2). The controller 27 now calculates the distance lx from the voltage Vx thus input from the tablet type position detecting means 11X, and puts the value into memory (Step S3). Also, when the position on the tablet type position detecting means 11X that intersects an extension of the line X2 is pressed (Step S4), the controller 27 calculates the distance lx from the voltage Vx thus input from the tablet type position detecting means 11X, and puts the value into memory (Step S5).

Similarly, in the tablet type position detecting means 11Y, after pressing the Y-coordinate input button 17

(Step S6), when the positions that intersect respective extensions of the lines Y1 and Y2 are pressed, the controller 27 calculates the respective distances ly, and puts the respective values into memory (Steps S6 through S10). Then, the document 13 is turned over, the copy side now facing down. Thus, when the start button 19 is pressed, only the area surrounded by the lines X1, X2, Y1 and Y2 is copied with other regions cut off. As described above, in the tablet type position detecting means 11X and 11Y, copy region can be easily specified by simply pressing the positions which intersect the extensions of the lines X1, X2, Y1 and Y2.

In this embodiment, the document 13 is placed with its copy side facing up when coordinates are input to specify a region 13a. Then, after turning over the document 13 with its copy side now facing down, the copy operation is carried out. Generally, when the document 13 is placed face down, the region 13a comes at a different disposition from when the document 13 is placed face up. In this embodiment, the process as hereinafter described is carried out to compensate the difference. The following description deals with the operation for copying in which the selected region 13a is erased. The copy operation to selectively copy the region 13a with other regions erased can be done in a similar manner.

Figure 9:
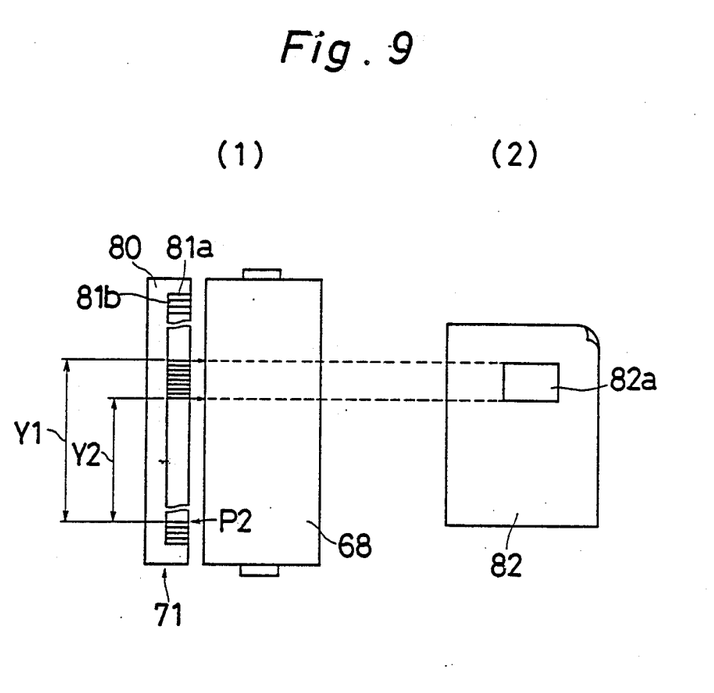
FIG. 9 shows the construction relating to the operation in one embodiment of the invention.

FIG. 9 illustrates such operation. Referring to FIG. 3 as well as FIG. 9, the previously mentioned selective discharging means 71 is formed from a substantial number of LED (Light Emitting Diode) elements 81a, 81b, ... (collectively denoted by the numeral 81) disposed in a housing 80. By causing a plurality of selected LED elements 81 to light, the region on the photosensitive drum 68 corresponding to the lighted LED elements 81 is discharged. This causes the image to be erased on the region 82a corresponding to the region 13a on the document 13, and a copy paper 82 is obtained on which the image on other regions is copied as shown in FIG. 9 (2). The LED elements 81 may be disposed in such a density as to match the position detecting precision of the position detecting means 11.

The following detailed description deals with the lighting and extinguishing control for the LED elements 81. In the position detecting means 11X and 11Y of the copying machine 12 shown in FIG. 2, the position P1 in the bottom left-hand corner of the platen glass 14 is used as the hole position for the document 13 against which the desired coordinates are input. In the selective discharging means 71, the corresponding position to the home position P1 is set as the home position P2 which is on the predetermined nth LED element counted from one end of the LED array 81.

Thus, when the coordinates Y1 and Y2 are input from the position detecting means 11Y, the LED elements 81 disposed between the distances Y1 and Y2 from the home position P2 are caused to light, as shown in FIG. 9 (1), with the other LED elements 81 staying off. Also, the timing for lighting the LED elements 81 is determined with reference to: the distance l11 from the above noted home position detecting element 83 to the leading edge of the document 13; the distance fl2 from the position o the photosensitive drum 68 corresponding to the selective discharging means 71 to the position where the light reflected from the mirror 67 strikes the photosensitive drum 68; and the moving speed of the light source 63, i.e. the rotating speed E1 of the photosensitive drum 68.

That is, the timing is set in such a way that the LED elements 81 are caused to light when the time T1 has elapsed after the light source 63 has passed the position corresponding to the home position detecting element 83, the time T1 being expressed as $$T1 = \frac{l11 + X1}{E1} - \frac{l12}{E1} \tag{5}$$

and caused to go off when the time T2 has elapsed after the light source 63 has passed the region corresponding to the above noted hope position detecting element 83, the time T2 being expressed as $$T2 = \frac{l11 + X2}{E1} - \frac{l12}{E1} \tag{6}$$

As previously described, the image of the document 13 placed on the platen glass 14 is projected upside down on the photosensitive drum 68 through an optical means such as a lens, being reflected by the reflecting mirror 64. Therefore, the above technique allows the operation for copying in which the selected region 13a on the document 13 is erased.

As previously mentioned, the lower electrode 24 is formed from a strip of resistor. In such a case, it is known that the potential relative to the positions on the lower electrode 24 varies in a nonlinear form as shown by the curve M in FIG. 8. This phenomenon is mentioned in the description of the prior art. To solve this problem, the present invention embraces other embodiments as hereinafter explained in which a novel technique is provided for the structure and processing contents of the operations in the steps S3, S5, S8 and S10 in the flowchart of FIG. 7.

Figure 10:
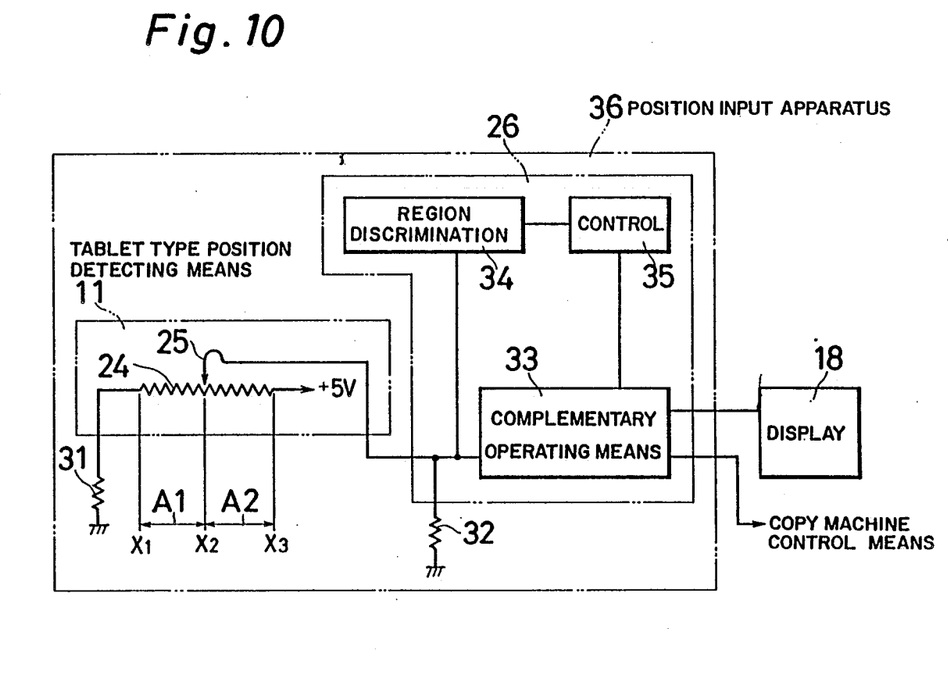
FIG. 10 is a block diagram showing the construction of a position input apparatus 40.

As shown in FIG. 10, one end of the lower electrode 24 in the tablet type position detecting means 11 is connected to a +5 V supply, while the other end is grounded via a resistor 31. On the other hand, the upper electrode 25 is grounded via a resistor 32, while at the same time connected to a complementary operating means 33 and an area discriminating means 34 which are both contained in the CPU 26.

The complementary operating means 33 already has in its memory the analog-digital converted values of the voltage output obtained when each of the reference points X1 to X3 (FIG. 2) in the tablet type position detecting means 11 is pressed, and performs complementary operation of a pressed position, as hereinafter explained, on the basis of the analog-digital converted values of the voltage output from the tablet type position detecting means 11 when the tablet type position detecting means 11 is pressed to input the position and the previously stored values from the above noted reference points.

The region discriminating means 34 which is connected along with the complementary operating means 33 to the upper electrode 25 in the tablet type position detecting means 11 is used to discriminate to which region in the position detecting means 11 a pressed position belongs when the tablet type position detecting means 11 is pressed.

The region discriminating means 34 is also connected to a control means 35. The control means 35 is further connected to the complementary operating means 33 and controls the complementary operating means 33 on the basis of the discrimination made by the region discriminating means 34 to cause it to perform complementary operation as hereinafter described in accordance with the reference points defining the region to which the pressed position on the tablet type position detecting means 11 belongs.

While connected to a display 18, the complementary operating means 33 is also connected to a copying machine control means not shown in the figure which controls the operation of the copying machine 12.

The tablet type position detecting means 11, the complementary operating means 33, the region discriminating means 34 and the control means 35 combine to comprise a position input apparatus 36. In the above construction, a voltage of +5 V is applied to the lower electrode 24 in the tablet type position detecting means 11 and to the resistor 32 connected in series therewith. Since the lower electrode 24 is formed from a strip of resistor, the potential relative to the positions on the lower electrode 24 is given as shown by the curve M in FIG. 7.

When the upper sheet 22 is pressed from above, the upper electrode 25 contacts the lower electrode 24 at the position pressed, and a voltage equivalent to the potential at the position pressed on the lower electrode 24 is developed in the upper electrode 25 and is output to the complementary operating means 33 and the region discriminating means 34.

On the other hand, the complementary operating means 33 already has in its memory the values $(AD)_{V1}$, ..., $(AD)_{V3}$ (where, $(AD)_{V1} < (AD)_{V2} < (AD)_{V3}$ obtained by analog-digital converting the voltages V1-V3 output when the respective reference points X1-X3 in the tablet type position detecting means 11 are pressed.

Figure 11:
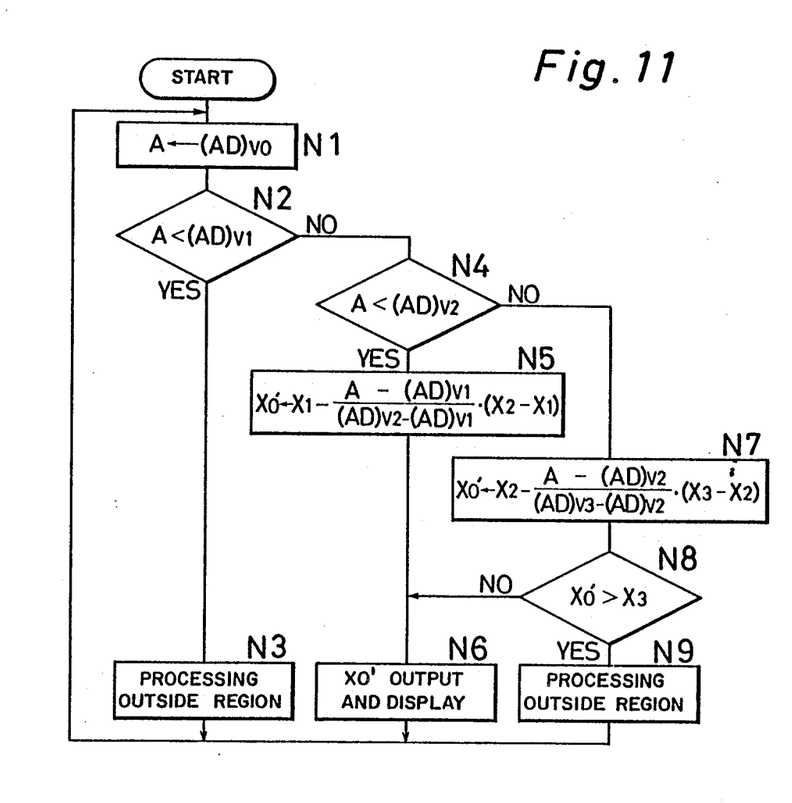
FIG. 11 is a flowchart illustrating the operation performed in the position input apparatus 40.

When the tablet type position detecting means 11 is pressed to input a position, the complementary operating means 33, the region discriminating means 34 and the control means 35 perform the operation illustrated in the flowchart of FIG. 11. Suppose the position pressed in the tablet type position detecting means 11 is X0, the voltage output at this time from the tablet type position detecting means is V0, and the analog-digital converted value of the voltage V0 is $(AD)_{V0}$. Referring to FIG. 11, the analog-digital converted value $(AD)_{V0}$ of the voltage output from the tablet type position detecting means 11 according to the pressed position is stored in memory as a variable A (Step N1), and the variable A is checked if it is smaller than the value $(AD)_{V1}$ at the reference point X1 (Step N2). If the variable A is smaller than the value $(AD)_{V1}$, the pressed position is outside the input enable region, and the operation proceeds to Step N3 for processing outside the region and returns to Step N1.

In Step N2, if the variable A is discriminated to be bigger than the value $(AD)_{V1}$, the operation proceeds to Step N4, and the variable A is checked if it is smaller than the value $(AD)_{V2}$. If the variable A is smaller than the value $(AD)_{V2}$, the pressed position is discriminated to be within the region A1 between the reference points X1 and X2, and the operation proceeds to Step N5 in which a complementar operation is performed using the following equation with the values $(AD)_{V1}$ and $(AD)_{V2}$ respectively at the reference points X1 and X2 and the variable A to obtain the operated position X0, of the pressed position X0. That is, the operation is performed by approximating the potential relationship to the positions on the lower electrode 24 to a straight line as shown by the dashed line in FIG. 8.

$$X0' = X1 + \frac{A - (AD)_{V1}}{(AD)_{V2} - (AD)_{V1}} \cdot (X2 - X1) \quad (7)$$

The operated position X0' thus obtained is transmitted to the copying machine control means, while being displayed on the display 18 (Step N6). The operation then returns to Step N1.

In Step N4, if the variable A is bigger than the value $(AD)_{V2}$, the pressed position is discriminated to be within the region A2 between the reference points X2 and X3, and the operation proceeds to the Step N7. In Step N7, a complementary operation is performed in a similar manner to Step N5, using the values $(AD)_{V2}$ and $(AD)_{V3}$ respectively at the reference points X2 and X3 and the variable A to obtain the operated position X0' of the pressed position X0.

$$X0' = X2 + \frac{A - (AD)_{V2}}{(AD)_{V3} - (AD)_{V2}} \cdot (X3 - X2) \quad (8)$$

Then, the operated position X0 is checked if it is beyond the reference point X3 (Step N8).

In Step N8, if the operated position X0' is discriminated to be beyond the reference point X3, the pressed position is outside the input enable area. The operation proceeds to Step N9 for processing outside the area as in the case of Step N3, and returns to Step N1.

In Step N8, if the operated position X0' is discriminated to be not beyond the reference point X3, the operation proceeds to Step N6, in which the operated position X0' is output to the copying machine control means while being displayed on the display 18. The operation then returns to Step N1. As explained, when the tablet type position detecting means 11 is pressed, the region to which the pressed position belongs is discriminated by the region discriminating means 34, and the complementary operating means 33 performs complementary operation on the basis of the reference points for that area. Accordingly, by selecting the size of the region set in the tablet type position detecting means 11 to an appropriate size, error by complementary operation can be easily reduced and made smaller than the resolution of the complementary operating means 33 if the relationship of the output voltage relative to the pressed position in the tablet type position detecting means 11 is not linear.

Figure 12:
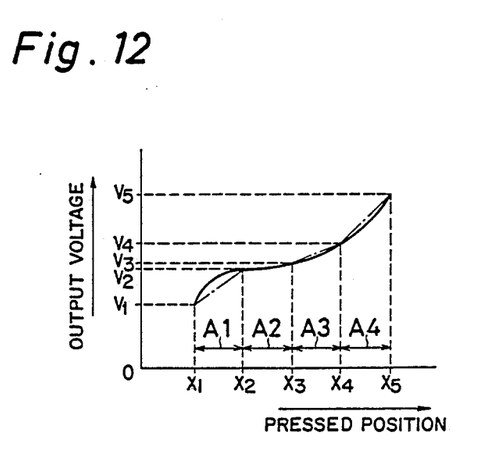
FIG. 12 shows the potential at each position on the lower electrode 24 in the position detecting means 11 when five reference points are provided in the position detecting means 11.

The accuracy of an input position can thus be enhanced, ensuring prevention of erroneous recognition of the input position. Therefore, after accurately specifying for example an region 13a on the document 13, when the start button 19 is pressed with the document 13 now placed face down, copying can be made with the region 13a precisely cut off. In this embodiment, the three reference points X1, ..., X3 are provided, with the two areas A1 and A2. However, this embodiment is not to be limited to the arrangement illustrated above. Any number of regions Ai (i=1,2, ..., n) may be set according to the input accuracy required, one example being shown in FIG. 12 in which five reference points X1, ..., X5 are provided to set four regions A1, ..., A4. Furthermore, it may be so constructed that the size of the regions in the tablet type position detecting means 11 can be set automatically so that error by complementary operation will be smaller than the resolution of the complementary operating means 33, etc.

Figure 13:
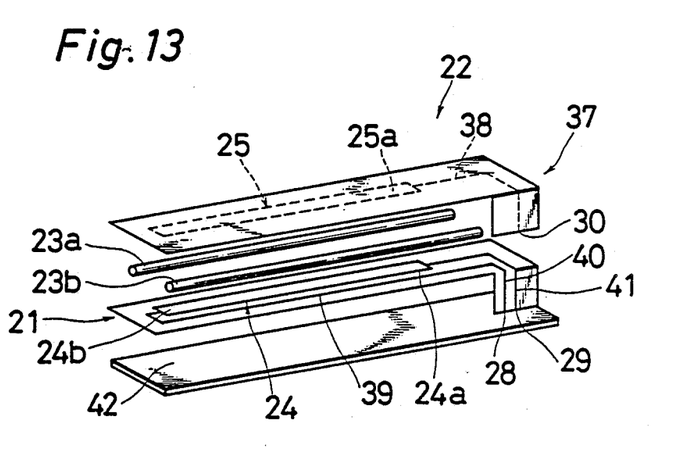
FIG. 13 shows an exploded view of position detecting means 37 in another embodiment of the invention.

FIG. 13 shows an exploded view of a tablet type position detecting means 37 according to another embodiment of the invention. This embodiment is analogous to the aforementioned embodiment, and like reference characters are used to designate corresponding parts.

As shown in FIG. 13, an end 25a of an upper electrode 25 is connected to an output terminal 30 by means of a lead 38, while an end 24b of a lower electrode 24 is connected to a wiring member 39 which extends to the vicinity of the other end 24a thereof. An end of the wiring member 39 and the end 24a of the lower electrode 24 is connected to voltage terminals 28 and 29 respectively by means of leads 40 and 41.

Figure 14:
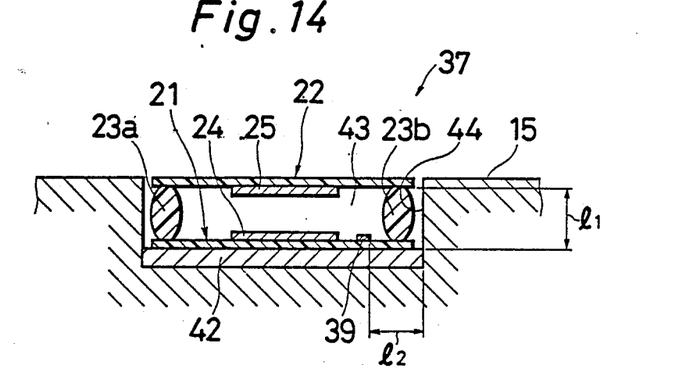
FIG. 14 is a vertical sectional view of the position detecting means 37.

Under a lower sheet 21 there is a grounded metal plate 42 which is formed of a conductive material such as iron. The size and shape of the metal plate 42 is set in such a way that if the distance from the upper surface of the upper electrode 25 to the upper surface of the metal plate 42 is $l1$, the upper electrode 25, the lower electrode 24 and the wiring member 39 are all positioned inwardly at least by $l1$ of the periphery of the metal plate 42, i.e. the inner surface 44 of a recessed portion 43 in an operation panel 15. That is, if the distance from the outermost portion of the upper electrode 25, the lower electrode 24 and the wiring member 39 to the periphery of the metal plate 42 is $l2$, it is so set that the following relation will hold.

$$l1 < l2 \ldots \ldots \quad (9)$$

When an upper sheet 22 is not pressed, the upper electrode 25 stays in a high impedance state. Also, when the upper sheet 22 is pressed, the output impedance is higher if the position pressed is nearer to the end 25a of the upper electrode 25. On the other hand, the metal plate 42 provided under the lower electrode 24 is grounded and constantly kept at the potential of 0 V. Furthermore, the distance $l1$ from the upper surface of the upper electrode 25 to the upper surface of the metal plate 42 is so set that $l1$ is smaller than the distance $l2$ from the outermost portion of the upper electrode 25, the lower electrode 24 and the wiring member 39 to the periphery of the metal plate 42.

Therefore, if electromagnetic wave or static electricity is developed in the vicinity of the tablet type position detecting means 37, the electromagnetic wave or the static electricity is absorbed in the metal plate 42. Accordingly, noise contained in the signal output from the position detecting means 37 is considerably reduced, thus ensuring prevention of malfunctioning or failing of a copying machine 12.

Figure 15:
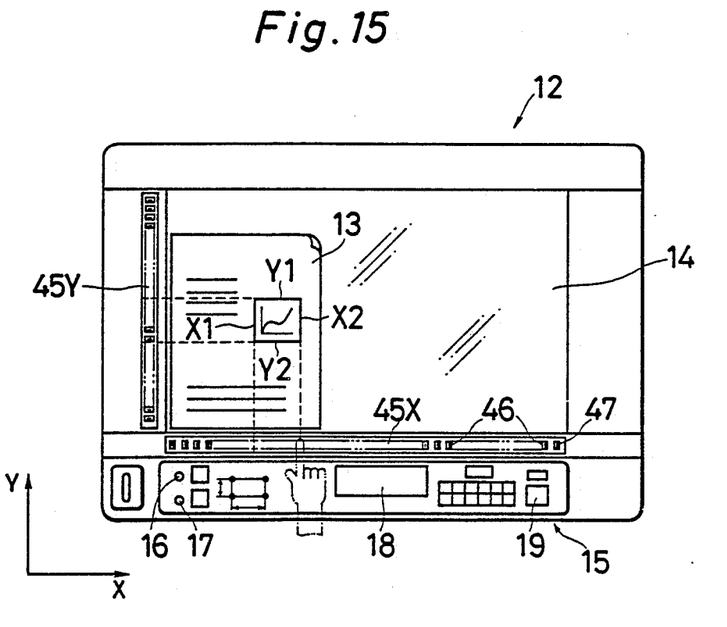
FIG. 15 shows a plan view of a copying machine 12 employing position detecting means 45 in a further embodiment of the invention.
Figure 16:
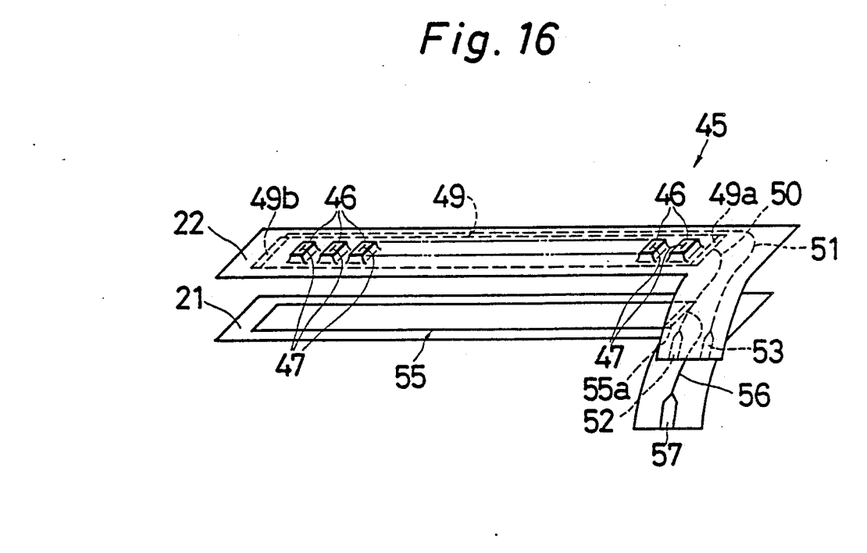
FIG. 16 shows an exploded view of the position detecting means 45.

FIG. 15 is a plan view of a copying machine 12 according to a further embodiment of the invention. A plurality of protrusions 46 disposed at given intervals to match the resolution of position input are formed on the upper surfaces of tablet type position detecting means 45X and 45Y of this embodiment of the invention. Also, the top of the protrusion 46 has a scale marking thereon 47 as shown in FIG. 16.

An upper electrode 49 formed from a strip of resistor is glued to the back surface of an upper sheet 22 formed for example from a polyester film with an adhesive layer 48 of acrylic or other type disposed therebetween. The upper electrode 49 has a uniform cross section along its entire length. The ends 49a and 49b of the upper electrode 49 are connected to voltage terminals 52 and 53 respectively by means of leads 50 and 51.

On the other hand, a lower electrode 55 formed from a strip of conductor of carbon, silver paste or other material is glued to the upper surface of a lower sheet 21 formed for example from a polyester film with an adhesive layer 54 of acrylic or other type disposed therebetween. An end 55a of the lower electrode 55 is connected to an output terminal 57 by means of a lead 56.

Figure 17:
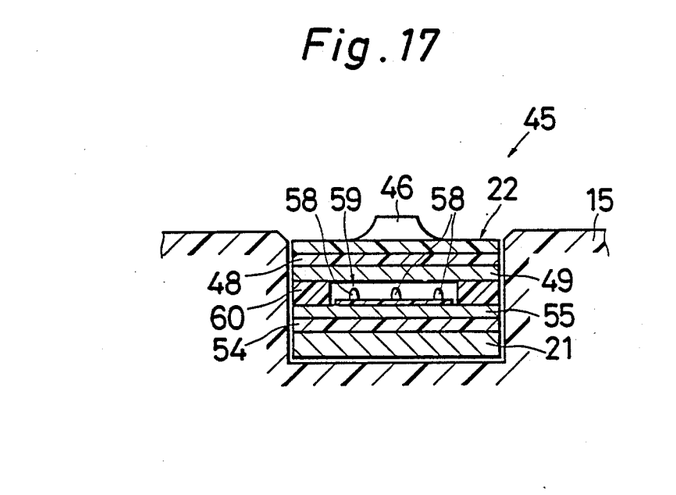
FIG. 17 shows a vertical sectional view of the position detecting means 45.

As shown in FIG. 17(a) spacer having a plurality of tiny protrusions 58 thereon is disposed between the upper electrode 49 and the lower electrode 55, while the periphery portions of the upper electrode 49 and the lower electrode 55 are glued by means of an adhesive layer 60 of acrylic or other type disposed therebetween.

Since the protrusions 46 are formed on the upper surface of the upper sheet 22 as described above, when the upper sheet 22 is pressed with a finger, the finger touches only the top of a protrusion 46. This makes the pressure converge on a limited region on the upper electrode 49 which comes directly under the bottom of the protrusion 46, thus contacting the upper electrode 49 with the lower electrode 55 only on this limited region.

It is therefore not necessary to use a special pen such as a stylus pen. Furthermore, if the finger to press the protrusion is a little too big, or if the position pressed on the protrusion is a little off the center, it will not enlarge the contact area or reduce the reproducibility, that is, the accuracy of position input will be not affected. Also, the provision of tablet type position detecting means 45X and 45Y in which only the distances in the X and Y directions are input such as described in this embodiment eliminates the need for tablet type position detecting means of the same size as that of the document 13, consequently contributing to the compactness of the construction, the enhancement of the operatability and the easiness of use.

In this embodiment, the resolution varies between the X direction and Y-direction, which however can be compensated when performing analog-digital conversion or operation by the CPU 26.

According to the invention, by setting the region size for complementary operation to an appropriate size, error by complementary operation can easily be reduced even if the relationship of the output relative to the pressed position in position detecting means is not linear. In particular, since error by complementary operation can easily be made smaller than the resolution of the complementary operating means, the present invention has the advantage that the resolution of complementary operating means can be enhanced to raise the accuracy of position input, ensuring prevention of erroneous recognition of a input position.

Furthermore, since electromagnetic wave or static electricity, if developed in the vicinity of the upper or lower electrodes, is absorbed in the grounded conductor, the invention has the advantage that noise contained in the signal output from a tablet type position input apparatus is considerably reduced, thus preventing malfunctioning or failing of an apparatus provided with a tablet type position input apparatus.

The invention also has the advantage that since the accuracy of position input is not affected if a special pen such as a stylus pen is not used, a tablet type position input apparatus with good operatability and superior accuracy can be constructed with ease and at low cost.

What is claimed is:

1. A position input apparatus comprising position detecting means for applying output corresponding to a pressed position;

complementary operating means for operating to complement the pressed position on the basis of both an output applied from the position detecting means and an output applied from the position detecting means when reference position is pressed by pressing the position pressing means;

region discriminating means for discriminating a region to which the pressed position belongs when the position detecting means is pressed;

control means for controlling the complementary operating means to perform complementary operation based on the reference points in the region to which the pressed position belongs, and at least more than three reference points and the regions between the neighboring reference points being set into the position detecting means.

2. A position input apparatus according to claim 1, wherein the position detecting means comprises a strip of conductor and a strip of resistor being disposed opposite each other with a space provided therebetween.

3. A position input apparatus according to claim 1, the complementary operating means performs the complementary operation using the following equation:

$$\frac{AD - AD_{Vi}}{AD_{V(i+1)} - AD_{Vi}} (X_{(i+1)} - Xi)$$

wherein Xi is coordinate of the reference points Pi (i−1, 2, . . . , N), Vi is analog output corresponding to the coordinate Xi, $AD_{Vi}$ is digital data corresponding to the analog output Vi, and AD is digital data corresponding to the pressed position X, when the digital data AD belongs to the region Ai between the reference points Pi and P(i+1).

4. A position input apparatus according to claim 1, wherein the positin detecting means comprises a strip upper electrode and strip lower electrode being disposed opposite each other, which functions to output an electrical signal corresponding to a pressed position;

a grounded conductor provided under the lower electrode, the upper and lower electrodes operatively connected to wiring members;

the upper and lower electrode sand the wiring members disposed so that they are positioned inwardly of the periphery of the grounded conductor at least by the distance equal to that from the upper surface of the upper electrode to the upper surface of the conductor.

5. A position input apparatus according to claim 1, wherein the position detecting means comprises:

upper and lower sheets being disposed opposite each other, an upper electrode installed on the back surface of the upper sheet, and a lower electrode installed on the upper surface of the lower sheet, wherein the position detecting means outputs an electrical signal of level corresponding to a position pressed on the upper sheet and has a plurality of protrusions provided on the upper surface of the upper sheet in accordance with the resolution of the position input.

6. A position detector provided in a position input apparatus comprising:

a strip upper electrode operatively connected to a lead, a strip lower electrode operatively connected to a wiring member, said lower electrode being disposed opposite said upper electrode and functioning to output an electrical signal of a level corresponding to a pressed position, a grounded conductor located under the lower electrode; and, the upper electrode and the lower electrode and said wiring member are all positioned inwardly of the periphery of the conductor at least by the distance equal to that from the upper surface of the upper electrode to the upper surface of the conductor.

7. The position apparatus according to claim 6, wherein the said wiring member has one end connected to one end of the lower electrode and another end connected to a lead, a major portion of the wiring member between the one end and another end being located substantially parallel to an edge of the lower electrode.

8. The position apparatus according to claim 7, wherein another end of the lower electrode is operatively connected to a lead.

9. The position detector according to claim 6 wherein said wiring member of the lower electrode is positioned inwardly from the edge of the ground plate a greater distance than the distance from the upper electrode to the lower electrode.

10. A position detector provided in a position input apparatus comprising:

upper and lower sheets being disposed opposite each other;

an upper electrode located on the back surface of the upper sheet and a lower electrode located on the upper surface of the lower sheet, the electrodes functioning to output an electrical signal of a level corresponding to a position pressed on the upper sheet; and means provided on the upper surface of the upper sheet for providing a protruding surface so that the protruding surface provides the only usual contact surface for fingers when fingers are used to apply pressure to the upper sheet so that input for achieving the output can be made precisely.

11. The position apparatus according to claim 10, wherein said upper electrode is a strip resistor and said lower electrode is a strip conductor.

12. The position detector of claim 10, wherein the protruding surface includes a plurality of closely spaced separated protrusions.

13. The position detector of claim 12, wherein said upper electrode is a strip resistor and said lower electrode is a strip conductor.

14. The position detector of claim 10, wherein there is a spacer with protrusions located between the upper and the lower electrodes.

* * * * *